(12) United States Patent
Yang et al.

(10) Patent No.: US 8,384,869 B2
(45) Date of Patent: Feb. 26, 2013

(54) LIQUID CRYSTAL DISPLAY DEVICE

(75) Inventors: Hee Jung Yang, Yangju-si (KR); Gyu Won Han, Yeoju-gun (KR); Jae Min Lee, Goyang-si (KR); Won Joon Ho, Jeonju-si (KR); Hoon Ki Chang, Goyang-si (KR); Byeong Seo Kim, Yesan-gun (KR)

(73) Assignee: LG Display Co., Ltd., Seoul (KR)

( * ) Notice: Subject to any disclaimer, the term of this patent is extended or adjusted under 35 U.S.C. 154(b) by 166 days.

(21) Appl. No.: 12/980,950

(22) Filed: Dec. 29, 2010

(65) Prior Publication Data

US 2012/0057116 A1 Mar. 8, 2012

(30) Foreign Application Priority Data

Sep. 7, 2010 (KR) .......................... 10-2010-0087334

(51) Int. Cl.
*G02F 1/1343* (2006.01)
(52) U.S. Cl. ........................................ 349/147; 349/141
(58) Field of Classification Search .................. None
See application file for complete search history.

(56) References Cited

U.S. PATENT DOCUMENTS

| | | | | |
|---|---|---|---|---|
| 4,556,288 A * | 12/1985 | Sekimura | ...................... | 349/137 |
| 5,046,825 A * | 9/1991 | Fertig | .......................... | 349/162 |
| 6,831,623 B2 * | 12/2004 | Yasukawa | ...................... | 345/90 |
| 7,528,917 B2 * | 5/2009 | Kim et al. | ...................... | 349/141 |
| 2007/0188689 A1 * | 8/2007 | Nakamura | ..................... | 349/122 |
| 2009/0079921 A1 * | 3/2009 | Mori et al. | .................... | 349/114 |
| 2010/0283923 A1 * | 11/2010 | Kawakami | ...................... | 349/5 |

* cited by examiner

*Primary Examiner* — Mike Stahl
(74) *Attorney, Agent, or Firm* — Brinks Hofer Gilson & Lione

(57) ABSTRACT

Disclosed is an LCD device comprising: a substrate; gate and data lines intersecting each other on the substrate; a thin film transistor at the intersection of the gate and data lines; a pixel electrode electrically connected with the thin film transistor; a common electrode forming an electric field with the pixel electrode; and a reflection control layer on at least one of the pixel electrode and common electrode. At this time, at least one electrode of the pixel electrode and common electrode is formed of the opaque metal material, to thereby improve black luminance and contrast ratio. Simultaneously, the reflection control layer is formed on the at least one electrode of the opaque metal material so that it is possible to adjust the reflectivity of external light, and to prevent the problem of rainbow-colored image.

7 Claims, 4 Drawing Sheets

US 8,384,869 B2

LIQUID CRYSTAL DISPLAY DEVICE

This application claims the benefit of the Korean Patent Application No. 10-2010-0087334, filed in Korea on Sep. 7, 2010, which are hereby incorporated by reference as if fully set forth herein.

BACKGROUND

1. Field of the Invention

The present disclosure relates to a liquid crystal display (LCD) device, and more particularly, to an LCD device with good contrast ratio.

2. Discussion of the Related Art

A liquid crystal display (LCD) device is widely used in various fields of notebook computer, monitor, spacecraft, aircraft, and etc. owing to advantages of low driving voltage and power consumption and portability.

The LCD device includes a lower substrate, an upper substrate, and a liquid crystal layer between the lower and upper substrates. Liquid crystal molecules in the liquid crystal layer are aligned according to an application of electric field, whereby light transmittance is adjusted based on the alignment of liquid crystal molecules, to thereby display images.

Hereinafter, a related art LCD device will be described with reference to the accompanying drawings.

FIG. 1 is a cross section view illustrating a related art LCD device.

As shown in FIG. 1, the related art LCD device includes a lower substrate 10, an upper substrate 20, and a liquid crystal layer 30 between the lower and upper substrates 10 and 20.

On the lower substrate 10, there is an element layer 12 such as a thin film transistor. Also, a common electrode 14 and a pixel electrode 16 are alternately provided on the element layer 12, whereby an in-plane electric field is formed between the common and pixel electrodes 14 and 16.

On the upper substrate 20, there is a plurality of light-shielding layer 22. Also, a color filter layer 24 is formed between each of the light-shielding layer 22, and an overcoat layer 26 is formed on the color filter layer 24.

In order to improve a contrast ratio in the related art LCD device, the common electrode 14 and pixel electrode 16 are formed of an opaque metal material. The reason for using the opaque metal material is to improve the contrast ratio by good black luminance.

However, if the common electrode 14 and pixel electrode 16 are formed of the opaque metal material, externally-provided light may be reflected on the common electrode 14 and pixel electrode 16, whereby picture quality is deteriorated due to a rainbow-color image shown on a screen.

BRIEF SUMMARY

An LCD device comprises a substrate; gate and data lines intersecting each other on the substrate; a thin film transistor at the intersection of the gate and data lines; a pixel electrode electrically connected with the thin film transistor; a common electrode forming an electric field with the pixel electrode; and a reflection control layer on at least one of the pixel electrode and common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a liquid crystal display (LCD) device according to the present invention will be described with reference to the accompanying drawings.

Figure 1:
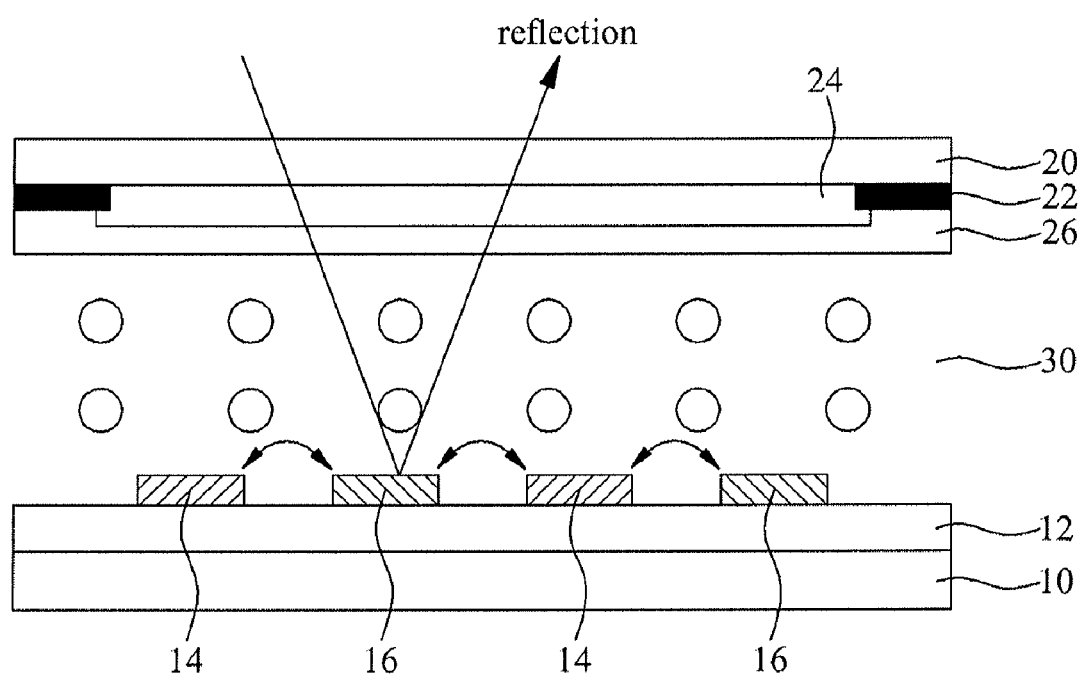
FIG. 1 is a cross section view illustrating a related art LCD device.
Figure 2A:
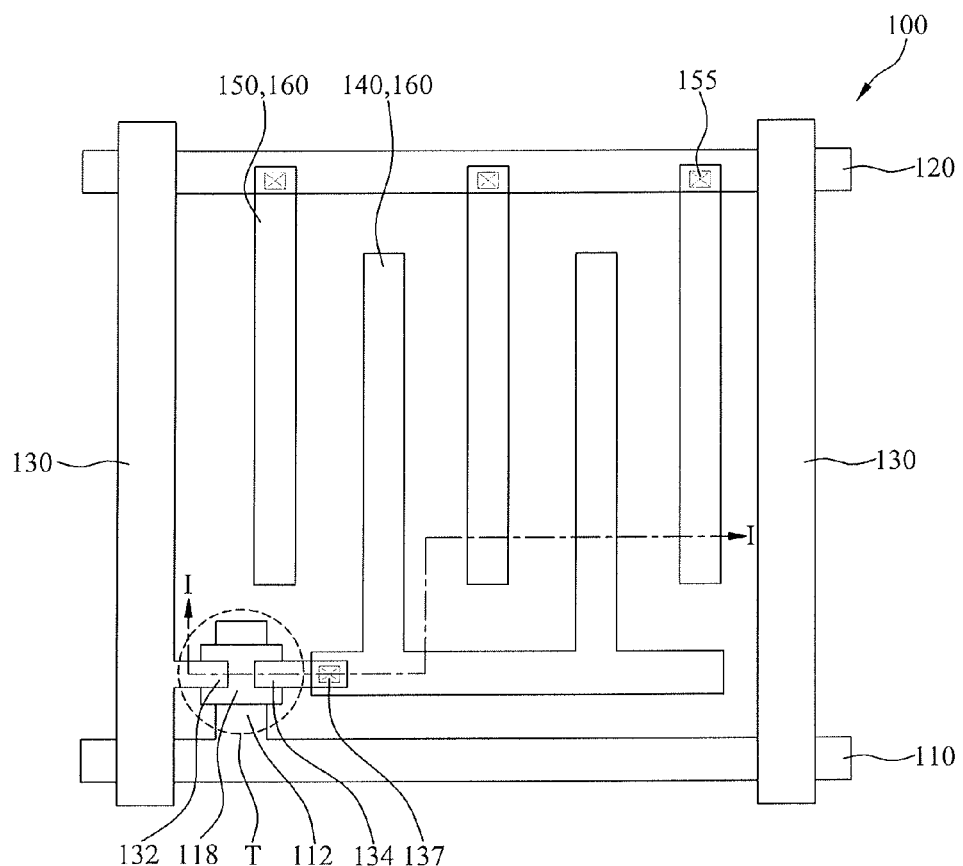
FIG. 2A is a plane view illustrating a substrate for an LCD device according to one embodiment of the present invention.
Figure 2B:
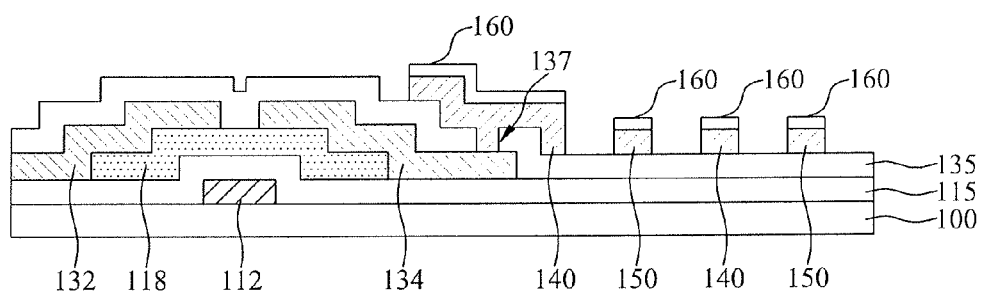
FIG. 2B is a cross section view along I-I of FIG. 2A.

FIG. 2A is a plane view illustrating a substrate for an LCD device according to one embodiment of the present invention. FIG. 2B is a cross section view along I-I of FIG. 2A. FIGS. 2A and 2B relate to an In-Plane Switching (IPS) mode LCD device.

As shown in FIG. 2A, an LCD device according to one embodiment of the present invention includes a substrate 100, a gate line 110, a common line 120, a data line 130, a thin film transistor (T), a pixel electrode 140, a common electrode 150, and a reflection control layer 160.

The gate line 110 and the common line 120 are arranged along a longitudinal direction of the substrate 100, wherein the gate line 110 and the common line 120 are provided on the substrate 100 at a predetermined interval therebetween. The gate line 110 and the common line 120 may be formed of the same material, and provided at the same layer.

The data line 130 is arranged along a vertical direction of the substrate 100, wherein the data line 130 is formed on the substrate 100. Thus, the gate line 110 and the data line 130 intersect each other, to thereby define each pixel region.

The thin film transistor (T) is formed at an intersection of the gate line 110 and the data line 130, wherein the thin film transistor (T) functions as a switch of the LCD device. The thin film transistor (T) includes a gate electrode 112, a semiconductor layer 118, a source electrode 132, and a drain electrode 134.

The gate electrode 112 is diverged from the gate line 110, and the source electrode 132 is diverged from the data line 130. The drain electrode 134 confronts with the source electrode 132. The semiconductor layer 118 is interposed between the gate electrode 112 and the source/drain electrode 132, 134.

The pixel electrode 140 is formed in the pixel region, and is electrically connected with the drain electrode 134 of the thin film transistor (T) via a first contact hole 137. Instead of connecting the pixel electrode 140 with the drain electrode 134 via the first contact hole 137, the pixel electrode 140 may be directly connected with the drain electrode 134. That is, the pixel electrode 140 may be extended from the drain electrode 134.

The pixel electrode 140 may be formed of an opaque metal material. For example, the pixel electrode 140 may be formed of the opaque metal material such as Mo, Ti, Mo alloy, Ti alloy, MoN, TiN, Zr, Hf, V, Nb, Ta, Cr, W, or Mn, but not necessarily.

The common electrode 150 is formed in the pixel region, and is electrically connected with the common line 120 via a second contact hole 155. Instead of connecting the common electrode 150 with the common line 120 via the second contact hole 155, the common electrode 150 may be directly connected with the common line 120. That is, the common electrode 150 may be diverged from the common line 120.

Like the aforementioned pixel electrode 140, the common electrode 150 may be formed of the opaque metal material such as Mo, Ti, Mo alloy, Ti alloy, MoN, TiN, Zr, Hf, V, Nb, Ta, Cr, W, or Mn, but not necessarily.

As the pixel electrode 140 is provided at a predetermined interval from the common electrode 150, an in-plane electric field is formed between the pixel electrode 140 and the common electrode 150, whereby an alignment direction of liquid crystal is changed by the in-plane electric field. The pixel electrode 140 and the common electrode 150 may be formed of the same material, and provided at the same layer, but not necessarily. The pixel electrode 140 and the common electrode 150 may be formed of the different materials, and provided at the different layers.

The reflection control layer 160 is formed on the pixel electrode 140 and the common electrode 150, to thereby control reflectivity of external light reflected on the pixel electrode 140 and common electrode 150. Thus, the reflection control layer 160 is capable of solving a related art problem of rainbow-colored image.

Preferably, the reflection control layer 160 is formed of a material having a predetermined refractive index, and is provided at a predetermined thickness. These will be explained in detail as follows.

First, the refractive index of the material for the reflection control layer 160 should be smaller than the refractive index of the material for the pixel electrode 140 and common electrode 150. That is, if the reflection control layer 160, which is formed of the material whose refractive index is smaller than the refractive index of the material for the pixel electrode 140 and common electrode 150, is formed on the pixel electrode 140 and common electrode 150, the incident light provided from the external is scattered on the interface between the pixel electrode 140 and the reflection control layer 160, and on the interface between the common electrode 150 and the reflection control layer 160, to thereby decrease reflectivity of the external light.

Especially, if the refractive index of the material for the reflection control layer 160 becomes smaller and smaller, the reflectivity of the external light is minimized. However, the refractive index capable of solving the problem of rainbow-colored image is enough for the LCD device according to the present invention. Accordingly, the reflection control layer 160 may be formed of the material whose refractive index is not more than about 30% of the refractive index of the opaque metal material for the pixel electrode 140 and common electrode 150. That is, if the refractive index of the material for the reflection control layer 160 is more than about 30% of the refractive index of the opaque metal material for the pixel electrode 140 and common electrode 150, the difference of refractive index is too small therebetween so that the problem of rainbow-colored image may occur due to the large reflectivity of the external light.

Preferably, the reflection control layer 160 is formed of transparent conductive oxide (TCO) or transparent conductive polymer among the various materials with the aforementioned refractive index. Although not shown, an alignment layer for initial alignment of the liquid crystal is formed on the upper surface of the reflection control layer 160. During the process of printing the alignment layer, a pin hole may occur in a contact surface between the reflection control layer 160 and the alignment layer. In order to prevent the pin hole from occurring during the process of printing the alignment layer, there is a need to use the optimal material for the reflection control layer 160. Based on various experimental results, the reflection control layer 160 may be formed of transparent conductive oxide (TCO) or transparent conductive polymer, to thereby prevent the pin hole from occurring in the alignment layer.

The reflection control layer 160 may be formed of the transparent conductive oxide (TCO) such as ITO, IZO, AZO, or IGZO, but not necessarily.

In order to minimize the reflectivity of external light, it is preferable to form the thick reflection control layer 160. That is, if the reflection control layer 160 is thick, the light scattering rate is increased both on the interface between the pixel electrode 140 and the reflection control layer 160 and the interface between the common electrode 150 and the reflection control layer 160, to thereby decrease the reflectivity of external light. However, as mentioned above, the thickness is determined within the range capable of solving the problem of rainbow-colored image. Thus, the thickness of the reflection control layer 160 is not less than about 50 Å, preferably. If the thickness of the reflection control layer 160 is less than about 50 Å, the rainbow-colored image may occur due to the large reflectivity of external light.

The thickness of the reflection control layer 160 is not more than about 1000 Å, preferably. This is because the reflectivity of external light approaches to '0' at the thickness 1000 Å of the reflection control layer 160. That is, even though the thickness of the reflection control layer 160 is more than 1 about 000 Å, the reflectivity of external light is not decrease while the process time and cost is increased.

A cross section of the LCD device according to one embodiment of the present invention will be explained in detail with reference to FIG. 2B. As shown in FIG. 2B, the gate electrode 112 is formed on the substrate 100, and a gate insulating layer 115 is formed on the entire surface of the substrate 100 including the gate electrode 112.

The semiconductor layer 118 is formed on the gate insulating layer 115, and the source and drain electrodes 132 and 134 are formed on the semiconductor layer 118. The semiconductor layer 118 may comprise an active layer which functions as an electron-drift channel, and an ohmic contact layer which is formed on the active layer so as to lower a charge-transfer barrier.

The structure of thin film transistor (T) comprising the gate electrode 112, the semiconductor layer 118, the source electrode 132, and the drain electrode 134 may be changed in various ways. For example, the thin film transistor (T) may be formed in a bottom gate type or top gate type, wherein the bottom gate type indicates that the gate electrode 112 is formed under the semiconductor layer 118, and the top gate type indicates that the gate electrode 112 is formed on the semiconductor layer 118.

A passivation layer 135 is formed on the entire surface of the substrate 100 including the source and drain electrodes 132 and 134. The pixel electrode 140 and the common electrode 150 are alternately provided on the passivation layer 135. The pixel electrode 140 is electrically connected with the drain electrode 134 via the first contact hole 137.

The reflection control layer 160 is formed on the upper surface of the pixel electrode 140 and common electrode 150. Although not shown, the alignment layer is formed on the entire surface of the substrate 100 including the reflection control layer 160.

For the aforementioned description, the reflection control layer 160 is formed on the upper surface of the pixel electrode 140 and common electrode 150, but not necessarily. For example, the reflection control layer 160 may be formed on the upper surface of any one of the pixel electrode 140 and common electrode 150. Especially, any one of the pixel electrode 140 and common electrode 150 may be formed of a transparent metal material instead of the opaque metal material. In this case, the external light is not reflected on any one electrode of the transparent metal material. Thus, there is no need to form the reflection control layer 160 on the upper surface of any one electrode of the transparent metal material.

Figure 3A:
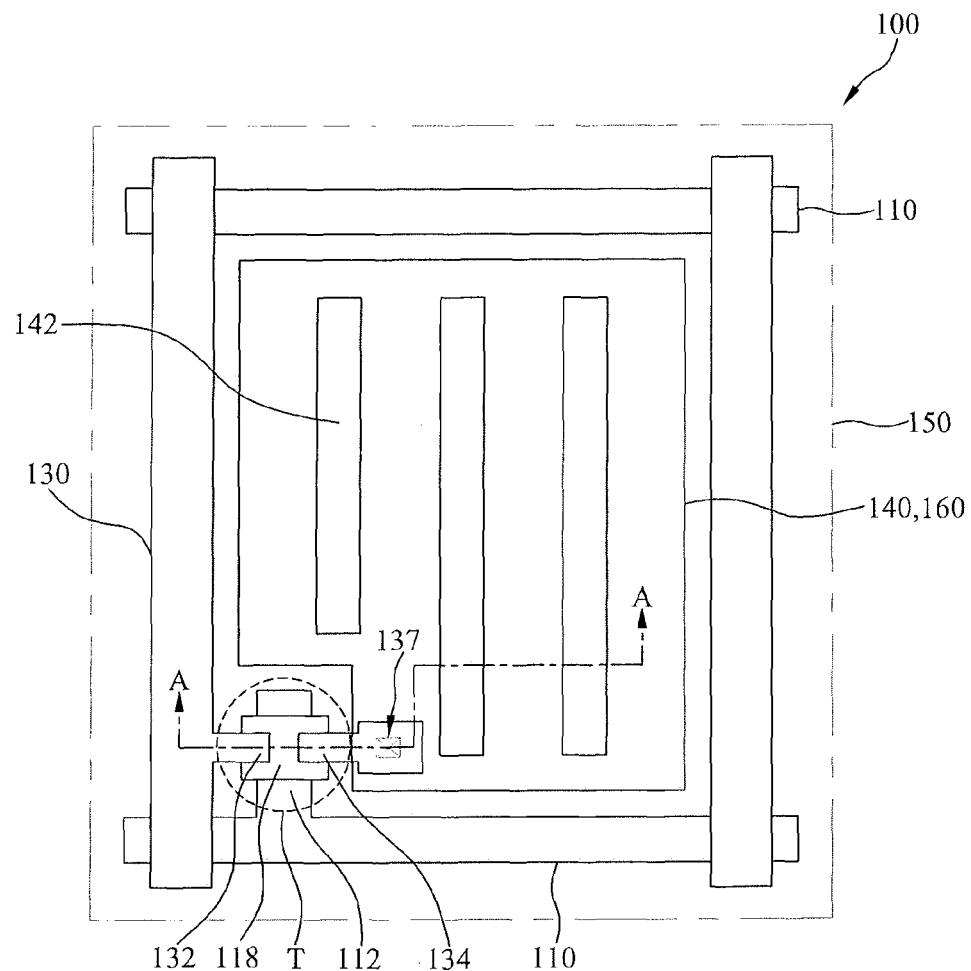
FIG. 3A is a plane view illustrating a substrate for an LCD device according to another embodiment of the present invention.
Figure 3B:
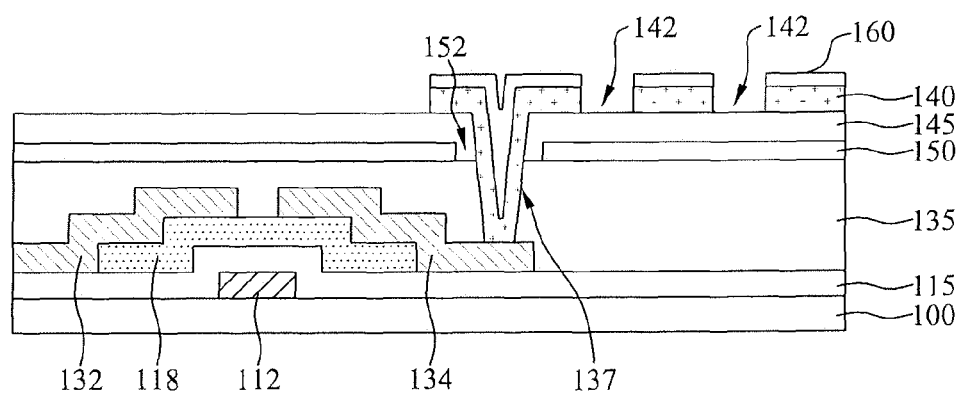
FIG. 3B is a cross section view along I-I of FIG. 3A.

FIG. 3A is a plane view illustrating a substrate for an LCD device according to another embodiment of the present invention. FIG. 3B is a cross section view along I-I of FIG. 3A. FIGS. 3A and 3B relate to a FFS (Fringe Field Switching) mode LCD device.

As shown in FIG. 3A, the LCD device according to another embodiment of the present invention includes a substrate 100, a gate line 110, a data line 130, a thin film transistor (T), a pixel electrode 140, a common electrode 150, and a reflection control layer 160.

The gate line 110 is formed along a longitudinal direction of the substrate 100, and the data line 130 is formed along a vertical direction of the substrate 100, whereby the gate line 110 intersects the data line 130, to thereby define each pixel region.

The thin film transistor (T) is formed at an intersection of the gate line 110 and the data line 130, wherein the thin film transistor (T) functions as a switch of the LCD device. The thin film transistor (T) includes a gate electrode 112, a semiconductor layer 118, a source electrode 132, and a drain electrode 134. The thin film transistor (T) is identical in structure to the aforementioned embodiment of the present invention, whereby a detailed explanation for the structure of the thin film transistor (T) will be omitted.

The pixel electrode 140 is formed in the pixel region, and is electrically connected with the drain electrode 134 of the thin film transistor (T) via a first contact hole 137.

The pixel electrode 140 is provided with at least one slit 142, whereby the pixel electrode 140 is formed in a finger shape.

The pixel electrode 140 may be formed of an opaque metal material. For example, the pixel electrode 140 may be formed of the opaque metal material such as Mo, Ti, Mo alloy, Ti alloy, MoN, TiN, Zr, Hf, V, Nb, Ta, Cr, W, or Mn, but may be other materials.

The common electrode 150 is formed on an entire display area of the substrate 100, wherein the common electrode 150 is entirely formed in a plate shape. The common electrode 150 is formed on the entire display area of the substrate 100. Thus, unlike the aforementioned embodiment of the present invention, the common electrode 150 is formed of a transparent conductive material.

The finger-shaped pixel electrode 140 is provided at a predetermined interval from the plate-shaped common electrode 150 by an insulating interlayer interposed between the pixel electrode 140 and the common electrode 150. In more detail, the common electrode 150 is formed under the insulating interlayer, and the pixel electrode 140 is formed above the insulating interlayer, whereby a fringe field is formed between the pixel electrode 140 and the common electrode 150, to thereby change an alignment direction of liquid crystal by the fringe field. This structure will be easily understood with reference to the following cross section structure of FIG. 3B.

The reflection control layer 160 is formed on the upper surface of the pixel electrode 140 so that it is possible to control the reflectivity of external light reflected on the pixel electrode 140, to thereby solve the related art problem of rainbow-colored image. Since the common electrode 150 is formed of the transparent conductive material, the external light is not reflected on the common electrode 150. Thus, there is no need to form the reflection control layer 160 on the upper surface of the common electrode 150.

The detailed structure of the reflection control layer 160 is the same as the aforementioned embodiment of the present invention.

That is, a refractive index of a material for the reflection control layer 160 should be smaller than a refractive index of a material of the pixel electrode 140. Especially, in order to solve the problem of rainbow-colored image, the reflection control layer 160 is formed of the material whose refractive index is not more than about 30% of the refractive index of the opaque metal material for the pixel electrode 140, preferably.

Among the materials satisfying the aforementioned conditions of refractive index, the reflection control layer 160 is formed of transparent conductive oxide (TCO) or transparent conductive polymer which is capable of preventing a pin hole from occurring in an alignment layer.

In order to minimize the reflectivity of external light, it is preferable to provide the thick reflection control layer 160. Especially, in order to overcome the rainbow-colored image, the thickness of the reflection control layer 160 is not less than about 50 Å, preferably. In consideration to the processing time and cost, the thickness of the reflection control layer 160 is not more than about 1000 Å, preferably.

A cross section of the LCD device according to another embodiment of the present invention will be explained in detail with reference to FIG. 3B. As shown in FIG. 3B, the gate electrode 112 is formed on the substrate 100, and a gate insulating layer 115 is formed on the entire surface of the substrate 100 including the gate electrode 112. The semiconductor layer 118 is formed on the gate insulating layer 115, and the source and drain electrodes 132 and 134 are formed on the semiconductor layer 118. Also, a passivation layer 135 is formed on the entire surface of the substrate 100 including the source and drain electrodes 132 and 134. These structures are identical in structure to those of the aforementioned embodiment of the present invention, whereby a detailed explanation for these structures will be omitted.

The common electrode 150 is formed on the passivation layer 135, and an insulating interlayer 145 is formed on the common electrode 150. Then, the pixel electrode 140 is formed on the insulating interlayer 145.

The pixel electrode 140 is electrically connected with the drain electrode 134 via the first contact hole 137. For this, the first contact hole 137 is formed in the insulating interlayer 145 and passivation layer 135. When the pixel electrode 140 is electrically connected with the drain electrode 134, a short can occur by the connection between the pixel electrode 140 and the common electrode 150. Thus, the common electrode 150 includes an aperture 152 in the area of the first contact hole 137 in order to prevent the short from occurring.

The reflection control layer 160 is formed on the upper surface of the pixel electrode 140. Although not shown, the alignment layer is formed on the entire surface of the substrate 100 including the reflection control layer 160.

Figure 4:
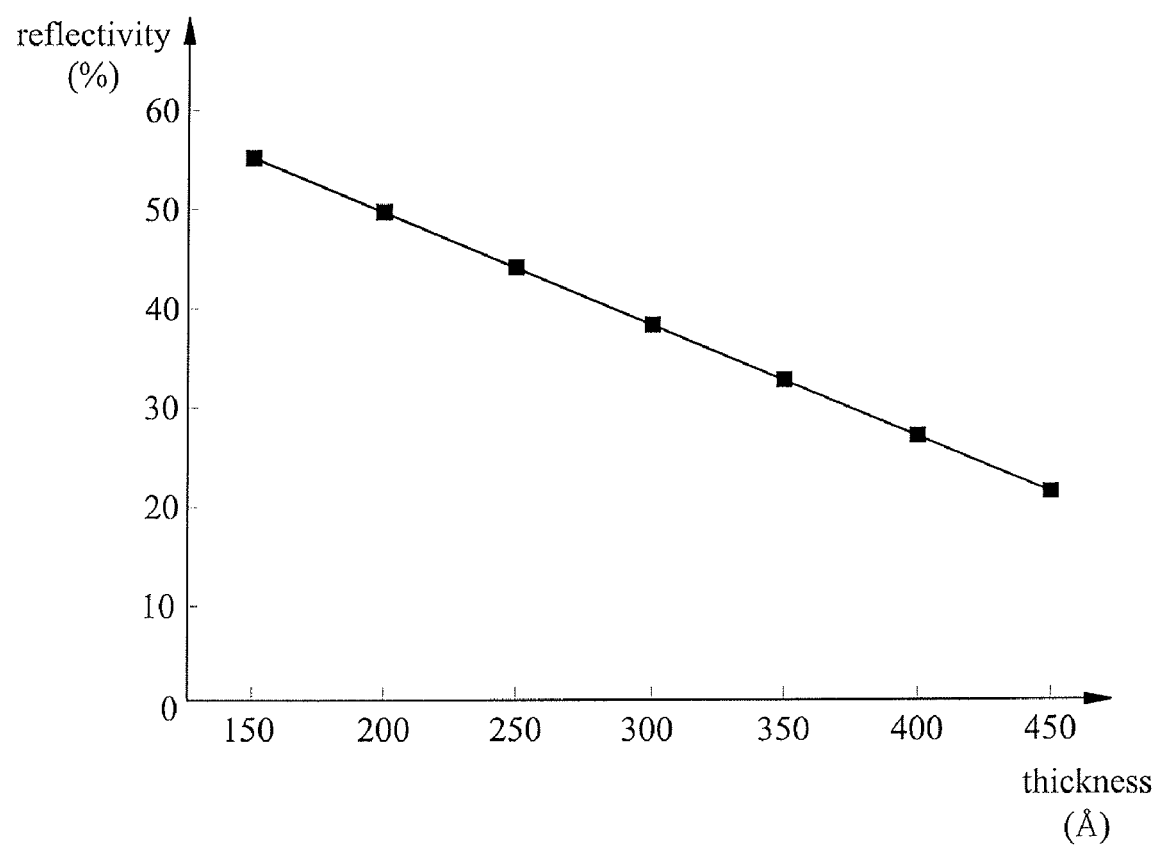
FIG. 4 is a graph illustrating the reflectivity change of external light according to the change in thickness of reflection control layer in the LCD device according to one embodiment of the present invention.

FIG. 4 is a graph illustrating the reflectivity change of external light according to the change in thickness of the reflection control layer in the LCD device according to one embodiment of the present invention.

FIG. 4 is a graph illustrating the reflectivity of external light when the electrode material of MoTi is formed at 200 Å thickness, and the reflection control layer of ITO is formed on the electrode material. As known from FIG. 4, the light reflectivity is gradually lowered according as the reflection control layer of ITO is gradually increased in its thickness.

The above explanation relates to the detailed structure of the lower substrate. The LCD device according to the present invention includes the above-described lower substrate, the upper substrate, and the liquid crystal layer between the both substrates. The upper substrate includes light-shielding layers which prevent light from leaking in the other portions except the pixel region; red (R), green (G), and blue (B) color filter layers respectively provided between each of the light-shielding layers; and an overcoat layer on the color filter layers.

As mentioned above, at least one electrode of the pixel electrode 140 and common electrode 150 is formed of the opaque metal material, to thereby improve black luminance and contrast ratio. Simultaneously, the reflection control layer 160 is formed on the at least one electrode of the opaque metal material so that it is possible to adjust the reflectivity of external light, and to prevent the problem of rainbow-colored image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An LCD device comprising:
   a substrate;
   gate and data lines intersecting each other on the substrate;
   a thin film transistor at the intersection of the gate and data lines;
   a pixel electrode electrically connected with the thin film transistor;
   a common electrode forming an electric field with the pixel electrode; and
   a reflection control layer on at least one of the pixel electrode and common electrode,
   wherein the pixel electrode or common electrode under the reflection control layer is formed of an opaque metal material, and wherein the reflection control layer is formed of a material whose refractive index is not more than about 30% of the refractive index of the opaque metal material.

2. The LCD device according to claim 1, wherein the reflection control layer is formed at about 50 to about 1000 Å thickness.

3. The LCD device according to claim 1, wherein the reflection control layer is formed of transparent conductive oxide or transparent conductive polymer.

4. The LCD device according to claim 1, wherein the opaque metal material is selected from the group consisting of Mo, Ti, Mo alloy, Ti alloy, MoN, TiN, Zr, Hf, V, Nb, Ta, Cr, W, and Mn.

5. The LCD device according to claim 1, wherein at least one of the pixel electrode and common electrode is formed of a transparent electrode; the remaining one is formed of an opaque electrode; and the reflection control layer is formed on the opaque electrode.

6. The LCD device according to claim 5, wherein the pixel electrode is formed of an opaque electrode above an insulating interlayer; the common electrode is formed of a transparent electrode under the insulating interlayer; and the reflection control layer is formed on the pixel electrode.

7. The LCD device according to claim 1, wherein the pixel electrode and common electrode are formed of the same material and provided on the same layer; and the reflection control layer is formed on the pixel electrode and common electrode.

* * * * *